United States Patent [19]

Yabune et al.

[11] 4,415,734

[45] Nov. 15, 1983

[54] PROCESS FOR PREPARATION OF CELLULOSE ACETATE

[75] Inventors: Hideo Yabune; Manabu Uchida, both of Himeji, Japan

[73] Assignee: Daicel Chemical Industries, Ltd., Osaka, Japan

[21] Appl. No.: 397,334

[22] Filed: Jul. 12, 1982

[30] Foreign Application Priority Data

Jul. 10, 1981 [JP] Japan ................................ 56-108672

[51] Int. Cl.$^3$ ........................... C08B 3/06; C08B 3/24
[52] U.S. Cl. ........................................ 536/76; 536/80
[58] Field of Search .................... 536/76, 79, 80, 81

[56] References Cited

U.S. PATENT DOCUMENTS

| | | | |
|---|---|---|---|
| 2,013,830 | 9/1935 | Malm et al. | 536/76 |
| 2,104,849 | 1/1938 | Conaway | 536/76 |
| 2,106,297 | 1/1938 | Dreyfus | 536/81 |
| 2,331,964 | 10/1943 | Dreyfus | 536/76 |
| 2,484,108 | 10/1949 | Martin et al. | 536/76 |
| 4,269,972 | 5/1981 | Yabune et al. | 536/80 |

FOREIGN PATENT DOCUMENTS

| | | | |
|---|---|---|---|
| 415329 | 8/1934 | United Kingdom | 536/81 |
| 459820 | 1/1937 | United Kingdom | 536/81 |
| 690700 | 4/1953 | United Kingdom | 536/80 |

*Primary Examiner*—Ronald W. Griffin
*Attorney, Agent, or Firm*—Sughrue, Mion, Zinn, Macpeak and Seas

[57] ABSTRACT

Secondary cellulose acetate (cellulose diacetate) of improved whiteness is produced by ripening primary cellulose acetate (cellulose triacetate) using a lower aliphatic alcohol instead of an aqueous medium.

7 Claims, No Drawings

PROCESS FOR PREPARATION OF CELLULOSE ACETATE

FIELD OF THE INVENTION

The present invention relates to a novel process for the preparation of cellulose acetate, particularly to a novel process for the preparation of cellulose diacetate (i.e., secondary cellulose acetate) in which the ripening step is carried out by an alcoholysis reaction using a lower aliphatic alcohol such as methanol.

BACKGROUND OF THE INVENTION

Cellulose acetate is an organic ester of cellulose. It remains as the largest and most important commercial cellulose derivative because of its wide variety of uses such as in textile fibers, tobacco filter tips, plastics, films and paints.

In a conventional preparation of cellulose acetate (as described, for example, in Kirk-Othmer, *Encyclopedia of Chemical Technology*, Third Edition, vol. 5, pages 100 to 105, (1979), John Wiley & Sons, Inc.), the first step is to pretreat a cellulosic raw material such as wood pulp or cotton linter with a suitable amount of acetic acid.

Then, the resulting mixture is immersed in a cooled acetylating mixed solution to form primary cellulose acetate (completely esterified cellulose). In this step, the acetylating mixed solution comprises, for example, acetic acid as a solvent, sulfuric acid as a acetylation catalyst and acetic anhydride as an acetylating agent. The acetic anhydride is generally used in excess to the amount stoichiometrically equivalent to the sum of cellulose and water present.

After the acetylation step, an aqueous solution of a neutralizing agent, e.g. a carbonate, acetate, hydroxide or oxide of calcium, magnesium, iron, aluminum or zinc (preferably magnesium acetate), is added to hydrolyze the remaining acetic anhydride and to partly neutralize the acetylation catalyst.

In the next step, the ripening step, the resulting primary cellulose acetate is hydrolyzed by maintaining the ripening solution at 50°–90° C. while a small amount of acetylation catalyst (e.g., sulfuric acid) is still present, to transform the same to secondary cellulose acetate having a prescribed substitution degree of acetyl group and degree of polymerization. When the secondary cellulose acetate is obtained, the catalyst remaining in the ripening solution is generally completely neutralized with a neutralizing agent as exemplified above, though this additional neutralization may be omitted.

The ripened solution is then poured into water or dilute acetic acid or water or dilute acetic acid is poured into the ripened solution to separate the secondary cellulose acetate.

The secondary cellulose acetate is then washed and subjected to a stabilizing treatment to yield the desired final product.

Articles such as fibers, films or plastics made of cellulose acetate prepared by the above process are tinted pale yellow. This phenomenon is particularly remarkable with cellulose acetate produced from wood pulp as the raw material. For the commercial production of fibers, films or plastics, therefore, an after-treatment of treating or adding a bleaching agent, white pigment, fluorescent whitening agent or antioxidant has been applied before or at processing (e.g., spinning, molding) to reduce yellowness or improve whiteness. Such after-treatment, of course, is not completely effective and has only a limited effect.

The supply of cellulosic raw materials of good quality has become limited due to a world-wide shortage of natural resources and pollution problems with pulp mills and the cellulose derivatives industry has been obliged to change its raw materials from cotton linters to wood pulp and from high grade wood pulp to low grade wood pulp. Cellulose acetate produced from low grade wood pulp as a raw material especially tends to decreased commercial value because of its yellowness.

The origin of the yellowness of cellulose acetate products has been discussed in many publications and various theories have been presented. The most widely accepted theory is that non-cellulosic substances such as xylan in a pulp are the source of yellowness. (J. D. Wilson, R. S. Tabke, *Tappi*, 57, 77 (1974), F. L. Wells, W. C. Shattner, A. Walker, *Tappi*, 46, 581 (1963))

We have observed that the yellowness of cellulose acetate flake decreases with a reduction in the hemicellulose content (e.g., xylan) when the flake is washed with a lower aliphatic alcohol (e.g., methanol) to yield a dark coloured washing solvent (as described in Japanese Patent Publications Nos. 48-23542 and 48-23543). It can thus be understood that the extraction of cellulose acetate in flake form with a lower aliphatic alcohol can improve the whiteness of the flake. However, this washing procedure cannot be applied commercially because it leads to additional expense in the production cost of cellulose acetate.

SUMMARY OF THE INVENTION

After extensive research, we discovered that use of an alcoholysis reaction at ripening instead of an hydrolysis reaction yields various favorable results such as an elimination of yellowness.

DESCRIPTION OF PREFRRED EMBODIMENTS

Preferred embodiments of this invention are described below.

The lower aliphatic alcohol used in this invention is of relatively low molecular weight and low boiling point, for example, aliphatic alcohol having 1 to 3 carbon atoms. Examples thereof include methanol, ethanol, isopropanol and n-propanol. When the above alcohol is used, components in the solution after the alcoholysis reaction such as the acetate of the alcohol and excess alcohol can be easily recovered by distillation. Another advantage is that lower aliphatic alcohols generally have a high solubility to impurities in cellulosic raw materials as compared with water. Though methanol is most suitable, ethanol, isopropanol and n-propanol can be used in the same manner.

Generally speaking, preparation methods for cellulose acetate can be classified into two methods. These are the solvent method and the non-solvent method, the former being mostly used in commercial production.

The solvent method includes the "acetic acid method" and the "methylene chloride method" according to the diluent used, i.e., acetic acid for the former and a mixture of methylene chloride and acetic acid for the latter (as described in Marusawa and Uda, *Plastic Zai-ryo Koze* (*Plastic Material Lecture*), vol. 17, Chapter of Cellulosic resin, pages 60 and 67, (1960); J. H. Givens, et al., *Continuous and Staple Fibre Plants of Germany;* L. H. Smith, *Synthetic Fiber Development in Germany*).

Since a ripening step is compulsory in the "solvent method," this invention is an improvement in the "solvent method" for the preparation of cellulose acetate. Though the embodiments later shown are with the "acetic acid method", this invention can be also applied to the "methylene chloride method."

This invention relates to the step in which primary cellulose acetate is ripened in the presence of lower aliphatic alcohol such as methanol and the step in which secondary cellulose acetate is precipitated by pouring the ripened solution into a lower aliphatic alcohol. Through the above process, coloring substances in the cellulose acetate are extracted and transferred to the medium used which is a mixture of methanol/acetic acid (weight ratio of methanol/acetic acid being 80/20 to 95/5) during the precipitation.

In more detail, this invention relates to a preparation method in which ripening is carried out by alcoholysis with a lower aliphatic alcohol instead of hydrolysis in the conventional solvent methods in order to produce secondary cellulose acetate of a desired substitution degree of acetyl group of 2.20 to 2.95 and degree of polymerization of 120 to 260.

The ripening step of the present invention is carried out at normal pressure for about 2 to 24 hours. The ripening temperature depends on the boiling point of the lower aliphatic alcohol used (for example, 64° C. for methanol, 78° C. for ethanol, 82° C. for isopropanol and 97° C. for n-propanol).

The alcoholysis reaction can be represented by the following equation. The medium of the reaction mixture consists of acetic acid/methanol/methyl acetate since the last component is produced as a by-product.

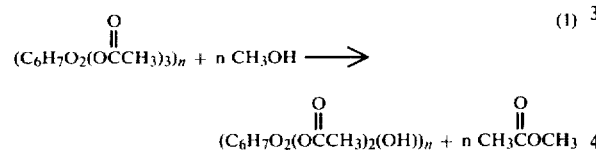

We have found that alcoholysis of the primary cellulose acetate illustrated by eq. (1) proceeds under mild conditions to produce secondary cellulose acetate having low yellowness.

In the case of the conventional "acetic acid method" or "methylene chloride method," acetic acid which is used as a diluent in the esterification reaction is separated as an aqueous solution of low concentration when secondary cellulose acetate is precipitated after the ripening step. Recovery of glacial acetic acid from dilute aqueous acetic acid solution is by an energy consuming process such as extraction/distillation and the recovery cost for acetic acid is largely responsible for the comparatively expensive production cost of conventional cellulose acetate.

According to the present invention, the liquid medium for the ripening as well as the washing liquid (e.g., the same alcohol as used for alcoholysis such as methanol) which was separated from the secondary cellulose acetate comprises non-aqueous components such as methanol, acetic acid and methyl acetate and these components can be separately recovered by distillation much easier than an aqueous solution.

According to this invention, there is another possibility of utilizing the above liquid composition, besides subjecting it to distillation, i.e., it can be reacted with carbon monooxide to yield a mixture of acetic acid/acetic anhydride per the procedure of Japanese Patent Publication No. 47-3334.

Though the present invention is illustrated by Examples as follows, it is not intended to be limited to Examples.

In the Examples, all percentages are weight percentages, all ratios are weight ratios and "parts" means "parts by weight," unless otherwise specified.

Further, sample yellowness was measured on a 12% solution in methylene chloride/methanol (9/1 by weight) solvent using a Hunter colorimeter to obtain the Yellowness Index (Y.I.) value. Larger Y.I. values means greater Yellowness.

Further, unless otherwise indicated, in the following Examples all temperatures were room temperature.

EXAMPLE 1

Wood pulp (i.e., dissolving pulp made by sulfite process) having an α-cellulose content of about 97% by weight was disintegrated. 100 parts of glacial acetic acid was uniformly sprayed on 100 parts of the disintegrated pulp and the resulting mixture was stirred at room temperature for 90 minutes. The thus treated pulp was then introduced into a cooled ($-10°$ C. to $+5°$ C.) liquid of 245 parts of acetic anhydride, 365 parts of glacial acetic acid and 15.0 parts of 98.5% conc. sulfuric acid and the system was stirred at below 45° C. to perform acetylation. The reaction mixture was a heterogeneous, fibrous slurry at the beginning of acetylation, turned to an opaque jelly and then to a pale yellow transparent syrup as the reaction proceeded. It took about 90 minutes from the start to the completion of the reaction, completion being judged by the disappearance of unreacted fiber in the syrupy reaction mixture.

After the acetylation was completed, 77.4 parts of an acetic acid solution of magnesium acetate (consisting of 15% magnesium acetate, 50% glacial acetic acid and 35% methanol) were added so that remaining excess acetic anhydride was decomposed to methyl acetate and acetic acid, and sulfuric acid was partially neutralized (theoretically 8 parts of sulfuric acid).

The reaction mixture was then heated to 70° C., and 29.0 parts of the above mentioned acetic acid solution of magnesium acetate and then 82 parts of methanol were added and the system was mixed. The remaining amount of sulfuric acid catalyst in the mixture was 4.0 parts (theoretical amount) at this time.

While heating the mixture at 70° C., methanol and methyl acetate vapour produced during the reaction were liquified in a condenser and returned to the heated mixture. After the reaction mixture was maintained at 70° C. for 1 hour, ripening was terminated by adding 44 parts of the acetic acid solution of magnesium acetate to completely neutralize the sulfuric acid catalyst.

1200 parts of methanol was slowly added to the mixture while vigorously stirring to precipitate the secondary cellulose acetate. The secondary cellulose acetate was filtered off and washed with methanol repeatedly until it was free of acetic acid. Finally, the secondary cellulose acetate was washed with water to remove inorganic salts such as magnesium sulfate, and then dehydrated and dried to yield secondary cellulose acetate flake.

Thus obtained secondary cellulose diacetate flake had a substitution degree of acetyl group of 2.41, and a viscosity average degree of polymerization of 173. The flake was dissolved in methylene chloride/methanol (9/1 by weight) and subjected to Yellowness Index measurement, which was found to be 3.3 Y.I.

EXAMPLE 2

Wood pulp having an α-cellulose content of about 97% by weight was disintegrated. 35 parts of glacial acetic acid was uniformly sprayed on 100 parts of the disintegrated pulp and the mixture was stirred at room temperature for 120 minutes. The treated pulp was then introduced into a previously cooled (about −10° C.) liquid consisting of 280 parts of acetic anhydride, 390 parts of acetic acid and 12.0 parts of sulfuric acid.

The temperature of the resulting mixture was gradually (for about 40 minutes) elevated to 50° and then maintained at 50° C. (for about 50 minutes) while stirring, whereby acetylation performed for 90 minutes.

After acetylation was deemed to be over, 41 parts of an acetic acid solution of sodium acetate (consisting of 20% sodium acetate and 80% glacial acetic acid) was added so that sulfuric acid was partially neutralized (theoretically 5 parts of sulfuric acid) and 45 parts of methanol was added to insure termination of acetylation by decmposing remaining excess acetic anhydride to methyl acetate and acetic acid.

The reaction mixture was then heated to about 65° C. and 33.5 parts of the above sodium acetate solution in acetic acid was added. The amount of sulfuric acid catalyst remaining in the mixture was 3.0 parts (theoretical amount).

The mixture was then heated to 70° C. and maintained at this temperature for 3 hours. As the substitution degree of acetyl group of the primary cellulose acetate decreased to the desired level at the end of this period, 29 parts of the above sodium acetate solution was added to terminate ripening by completely neutralizing sulfuric acid.

After ripening was over, 1200 parts of methanol was gradually added under vigorous stirring to precipitate the secondary cellulose acetate. The product was purified and dried in the same manner as in Example 1.

The product had a substitution degree of acetyl group of 2.43 and a viscosity average degree of polymerization of 170.

The product was dissolved in methylene chloride/methanol mixed solvent and subjected to yellowness measurement. The Yellowness Index of the product measured with an Hunter Colorimeter was 3.6 Y.I.

EXAMPLE 3

Acetylation was carried out in the same manner as Example 1.

After acetylation was completed, 87.1 parts of an acetic acid solution of magnesium acetate (consisting of 15% magnesium acetate, 50% glacial acetic acid and 35% methanol) were added to the mixture so that remaining excess acetic anhydride was decomposed and sulfuric acid was partially neutralized (theoretically 9 parts of sulfuric acid).

Upon heating the mixture to 60° C., 29.0 parts of the above magnesium acetate solution and 100 parts of methanol were added to the mixture, whereafter the mixture was heated to 70° C. and 60 parts of methanol was added and heating at 70° C. was continued for 3 hours. At the end of this period, 33.9 parts of the above magnesium acetate solution were added so that ripening was terminated by completely neutralizing sulfuric acid in the mixture.

1200 parts of methanol were then gradually added to the mixture while vigorously stirring to precipitate secondary cellulose acetate. The obtained secondary cellulose acetate was purified and dried in the same manner as in Example 1.

The product has a substitution degree of acetyl group of 2.38 and a viscosity average degree of polymerization of 176. The Yellowness Index (Hunter Colorimeter) measured in a methylene chloride/methanol solution was 3.1 Y.I.

COMPARATIVE EXAMPLE

Acetylation was carried out in the same manner as in Example 1 to obtain a primary cellulose acetate solution.

43.6 parts of an aqueous solution of magnesium acetate (30% concentration) was added to the solution so that acetylation was terminated by hydrolyzing excess acetic anhydride and partially neutralizing sulfuic acid. The amount of sulfuric acid in the solution was 6 parts (theoretical amount) after such partial neutralization.

The mixture was then heated to 60° C. and 12.2 parts of the same magnesium acetate aqueous solution (30% concentration) was added. The residual sulfuric acid in the mixture at that time was 3.5 parts (theoretical amount).

The bath concentration $$\left(\text{i.e., } \frac{\text{Acetic acid}}{\text{Acetic acid} + \text{Water}} \times 100\%\right)$$

of ripening mixture was so adjusted to be about 85% by adding water. The mixture then heated to 70° C. for 2 hours for ripening. Ripening was then terminated by adding 18.4 parts of the above magnesium acetate aqueous solution to completely neutralize sulfuric acid.

After ripening was over, a large amount of a 10% aqueous solution of acetic acid was added to the mixture with vigorously stirring to precipitate secondary cellulose acetate. The precipitate was filtered and washed with water until it became essentially free of acetic acid. The product was then dehydrated and dried to yield secondary cellulose acetate flake.

The thus obtained secondary cellulose acetate had a substitution degree of acetyl group of 2.44 and a viscosity average degree of polymerization of 182. Yellowness Index measured with a Hunter colorimeter was 6.4 Y.I.

While the invention has been described in detail and with reference to specific embodiment thereof, it will be apparent to one skilled in the art that various changes and modifications can be made therein without departing from the spirit and scope thereof.

What is claimed is:

1. In a process for preparing cellulose acetate by acetylating a cellulosic raw material to produce primary cellulose acetate and then converting the same to secondary cellulose acetate, the improvement wherein the cellulose material is acetylated to produce the primary cellulose acetate and then the primary cellulose acetate is converted to the secondary cellulose acetate by alcoholysis using a lower aliphatic alcohol without separating the cellulose triacetate from the acetylation system, the alcoholysis system also containing acetic acid from the acetylating step.

2. A process for preparing cellulose acetate according to claim 1, wherein the lower aliphatic alcohol is an aliphatic alcohol having 1 to 3 carbon atoms.

3. A process for preparing cellulose acetate according to claim 1, wherein the lower aliphatic alcohol is methanol.

4. A process for preparing cellulose acetate according to claim 1, wherein the secondary cellulose acetate has a substitution degree of acetyl group of 2.20 to 2.95 and a degree of polymerization of 120 to 260.

5. A process for preparing cellulose acetate according to claim 1, wherein the alcoholysis is carried out at normal pressure for 2 to 24 hours.

6. A process for preparing cellulose acetate according to claim 1, wherein the alcoholysis is carried out at the refluxing temperature of the medium.

7. A process for preparing cellulose acetate according to claim 1, wherein the secondary cellulose acetate is precipitated by using a lower aliphatic alcohol.

* * * * *